3,532,913
CONTACTS BETWEEN COMMUTATOR LAMEL-
LAE AND ARMATURE WINDING ENDS OF
ELECTRIC MOTORS
Walter Förste, Suhl, Thuringia, Gottfried Ostermay, Ber-
lin, and Joachim Schreiber, Leipzig, Germany, as-
signors to VVB Elektrogerate, Berlin, Germany
Filed Nov. 20, 1967, Ser. No. 684,147
Int. Cl. H01r 39/34; H02k
U.S. Cl. 310—234        13 Claims

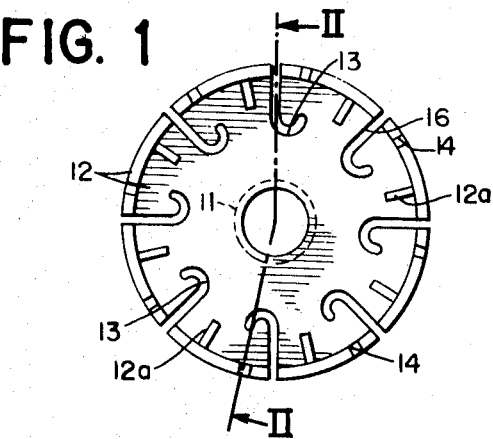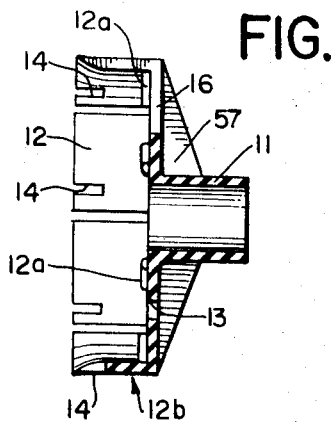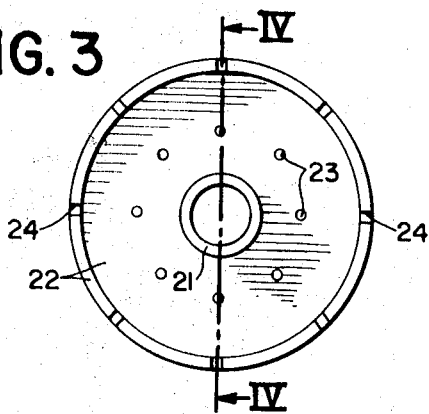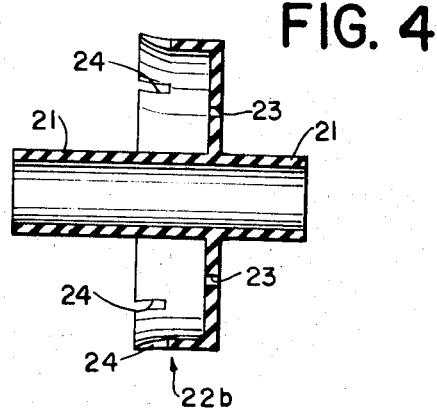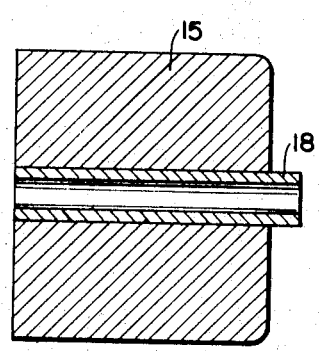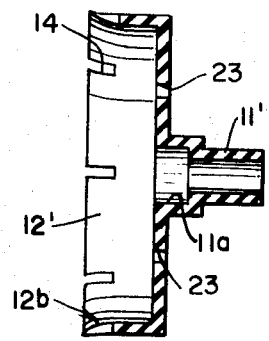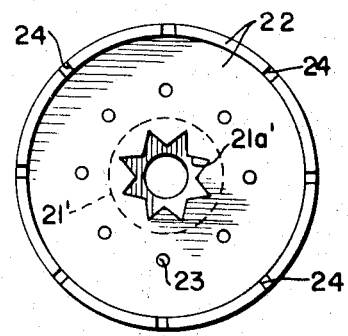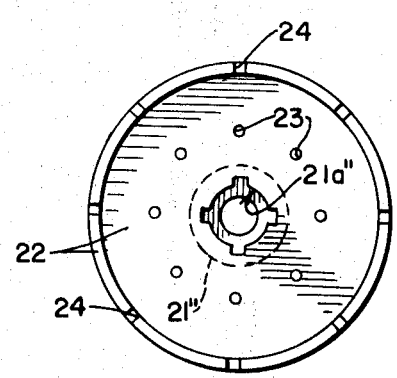

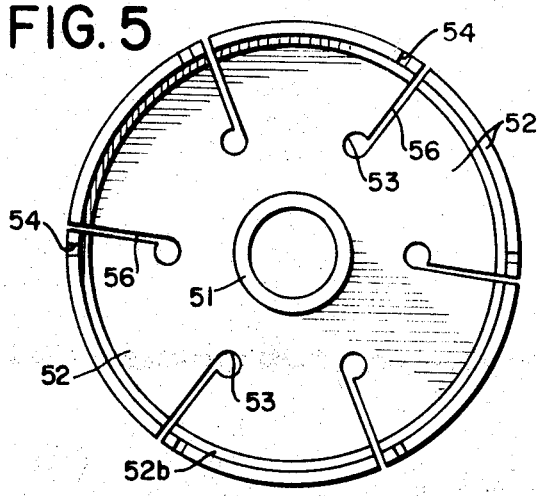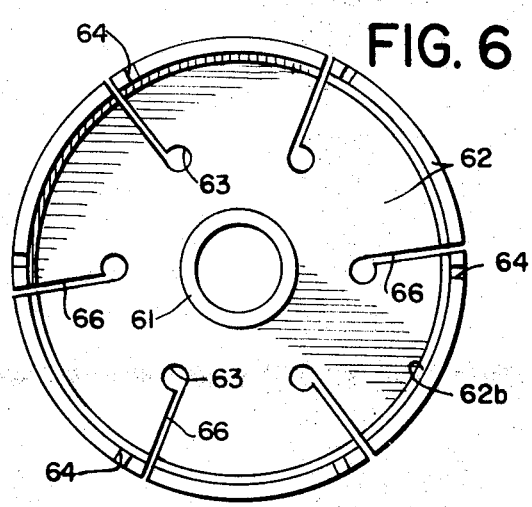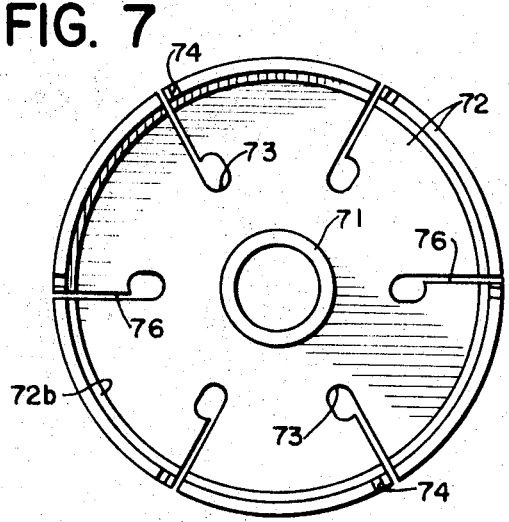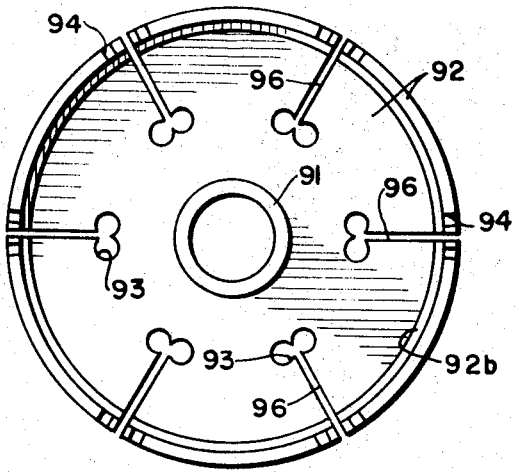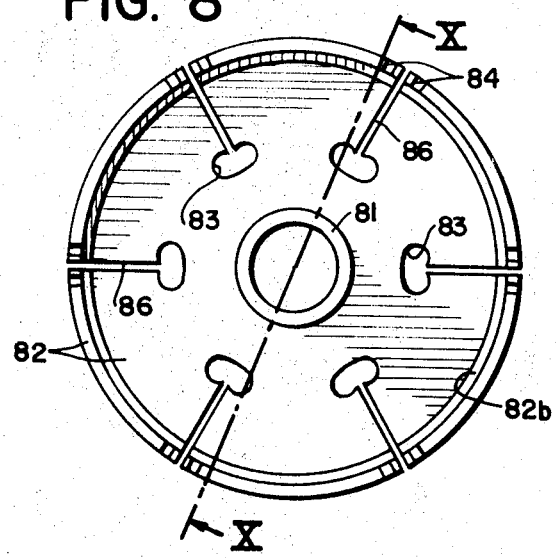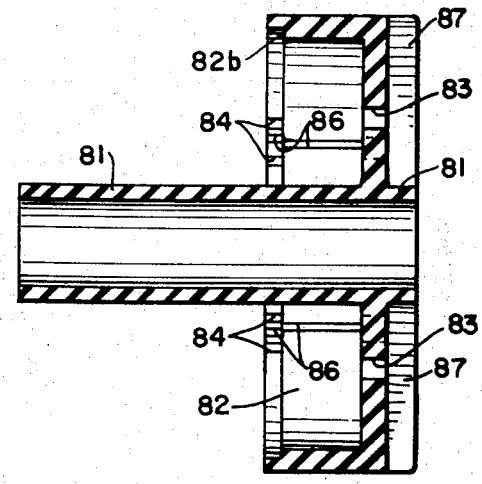

ABSTRACT OF THE DISCLOSURE

Contact assemblies for electric motors having carbon commutator or collector lamellae in a commutator body and armature winding ends in contact with the lamellae on the front side and partly on the contact surface, with a cylindrical connector cap, preferably of insulating material, having a hub and a collar thereon, with the improved arrangement constituted by a pre-fabricated commutator body centrally pressed into the connector cap. The front surface of the collar, facing the armature of the electric motor, has therein openings for receiving the winding ends. The number of the openings preferably corresponds to that of the lamellae. The collar has peripheral, radial grooves for receiving the winding ends, radially disposed with respect to the openings of the connector cap. The latter is preferably provided with slots running in the front surface of the cap and connecting to one or more of the openings in the front surface.

---

The invention relates to contacts or contact assemblies between carbon commutator lamellae and armature winding ends of electric motors or machines having carbon commutators or collectors.

It is known to provide a contact by ramming or stamping metal or carbon powder surrounding the armature winding ends in a bore or slot of the lamellae. However, these contacts are frequently damaged on account of the vibrations occurring during the operation of the motor as well as the centrifugal forces so that the motor is damaged.

It is also known, when making carbon commutator lamellae from carbon powder mixtures with the pressing method, to add metal powder to part of these mixtures and to introduce this part into the pressing mold so that only one end of the carbon commutator lamellae consists of a metal-carbon powder mixture which can be put into contact with the armature winding ends.

It is also known to copper-plate the portions of the lamellae which should make contact with the respective winding ends.

It is further known to attach metal rails or bars to the heel or bottom, or at the flanks, or the flanks of the lamellae, which carry connector flags or lugs for soldering the winding ends thereto.

It is a major drawback of these known contact assemblies that their production requires substantial material and time as well as a large number of parts while insufficient operational safety is achieved.

Contact assemblies became further known in which the lamellae are individually provided with slots, grooves or bores. The winding ends are passed through these bores, etc. before or after the assembly of the commutator or collector, they are then corrugated and retracted into the bores. Additional attachment is achieved by means of a conductive and hardening paste or cement in the grooves or bores.

It is a disadvantage of these contact assemblies that several complicated and costly operational steps are required for making the specially shaped carbon commutator lamellae and the electrical connections.

Finally, a contact arrangement has been suggested in which an annular, electrically nonconductive connector cap is attached to the front of the commutator body by suitable means; the cap having peripherally distributed grooves which are continued in the commutator body proper and serve for receiving the respective winding ends. An electrically conductive, hardening pourable compound is filled into the grooves for obtaining a durable contact connection.

It is the disadvantage of this solution that increased care has to be applied to the contacts on account of the use of an electrically conductive, hardening mass or compound since unintentional application or contact with conductive parts of the carbon commutator or the winding ends with the electrically conductive compound may lead to short circuits.

It is the object of the invention to improve the aforedescribed, technically complicated and time-consuming contact assemblies, to increase their quality, as well as to improve the operational safety of electrical motors, machines and devices having such carbon commutators.

It is another object of the invention to obtain an improved contact between carbon commutator or collector lamellae and armature winding ends by using a new type of a connector cap.

According to one of the important features of the invention the objects are solved by pressing the bare armature winding ends on the front and partly on the contact surface to the lamellae of a prefabricated carbon commutator body, centrally pressed into a connector cap, which is cylindrical, preferably made from insulating material, has a hub and a collar, and is attached to the armature shaft. Openings, for example of a circular or elliptical shape, are radially distributed around the periphery of the connector cap, for receiving the winding ends in the front surface of the cap, at a certain distance from the hub and the collar, said openings corresponding in their number to that of the lamellae. The collar has a corresponding number of grooves as a radial extension of the openings.

The armature winding ends, coming from the coil, are introduced into the openings before the carbon commutator body is pressed in, and arranged in the grooves of the collar.

In order to facilitate the introduction of the winding ends into the openings, these are preferably attainable through slots which start from the collar, run substantially radially in the front surface of the connector cap, and reach the openings tangentially or with hooked end portions. The arrangement of the slots with respect to the openings is provided according to the prevailing schemes of the armature winding ends.

It is particularly advantageous to provide pairs of adjoining or partly merging or interconnected openings which can be reached from the collar with a common slot, and this arrangement allows to satisfy all possible connecting schemes of the winding ends to the lamellae of a carbon collector having a connector cap. In this case preferably two grooves are provided on the collar in flanking arrangement with respect to the slots, as a radial continuation of the openings.

In order to attain a satisfactory contact between the winding ends and the lamellae, a bevel and/or groove structure may be provided on their front side.

For purposes of stabilization, the connector cap may be provided on its front surface, facing the armature of the motor, with reinforcements, for example ribs, also providing a fan effect in the motor.

So as to attain a precise introduction of the carbon commutator body into the connector cap, either the former or the latter may be provided with a hub, the length of which corresponds in the latter case to that of the carbon commutator lamellae.

However, if the commutator body is alternatively provided with a hub projecting beyond the lamellae, it is advisable to provide the hub of the connector cap with a stepped projection having any suitable profile, for receiving the hub of the carbon commutator body, which is then provided with an appropriate, complementary profile.

In lieu of the hub-shaped projection, the connector cap may be provided on its front, facing away from the armature, with a number of ribs corresponding to that of the lamellae, in which case the grooves in the collar are preferably disposed between two adjoining ribs, when viewed in axial direction. The width of the ribs corresponds in this case to that of the frontal lamella joints of the commutator body.

Additional attachment of the connector cap to the commutator body is achieved by uniting these elements with an electrically nonconductive cement, adhesive or resin.

In order to facilitate the running-in of the adhesive or resin, and to prevent the shearing of the armature winding ends when pressing in the commutator body into the connector cap, the collar is preferably thinner or tapering toward its outer edge, or it may have a stepped projection on its inner edge.

It is one of the major advantages of the present invention that a contact is achieved between the commutator lamellae and the winding ends which requires few parts, relatively small labor, and will satisfy the requirements for a prolonged period of time. Production can be automated on account of the proposed simple assembly steps. Furthermore, the lamellae are additionally, radially supported by the overlap of the collar, against damages resulting from the effects of the centrifugal forces.

The various objects, features and attendant advantages of the present invention will become more apparent from the following description of preferred, exemplary embodiments of the inventive contact assemblies when considered in conjunction with the accompanying drawings, wherein FIG. 1 shows a first exemplary embodiment of a connector cap according to the invention, having openings therein, connected with hooked-end slots, in a somewhat schematic top view;

FIG. 2 is a sectional view, taken along line II—II of FIG. 1;

FIG. 3 shows another embodiment, having circular openings, also in a top view, similar to that of FIG. 1;

FIG. 4 is again a sectional view, taken along line IV—IV of FIG. 3, and illustrating a modification with an extended hub for receiving the carbon commutator body (see also FIG. 12);

FIG. 5 is another top view of an inventive connector cap embodiment, having circular openings, tangentially connected to the slots;

FIG. 6 is yet another view of a further embodiment, similar to FIG. 5, wherein the slots connect to the openings from the other side;

FIG. 7 is still a further embodiment, having elliptical openings tangentially reached by the slots;

FIG. 8 is yet a further embodiment, having partly merging openings with a common connecting slot;

FIG. 9 is another exemplary embodiment, having two adjoining openings which are reached by the same slot;

FIG. 10 is a sectional view through a connector cap as shown in FIG. 6, and having an extended hub portion, the view being taken along line X—X of FIG. 8;

FIG. 11 is a sectional view of a modification of the connector cap shown in FIGS. 1 and 2, wherein the hub has a step-like projection;

FIG. 12 is a schematic sectional view of a carbon commutator body having an extended hub, to cooperate, for example, with the connector cap embodiment of FIG. 11;

FIG. 13 is again a top view of a further exemplary connector cap embodiment, having a stepped hub projection with an axial profile, for cooperation with the commutator body;

FIG. 14 is a top view similar to that of FIG. 13, but showing a different hub profile;

Figure 15:
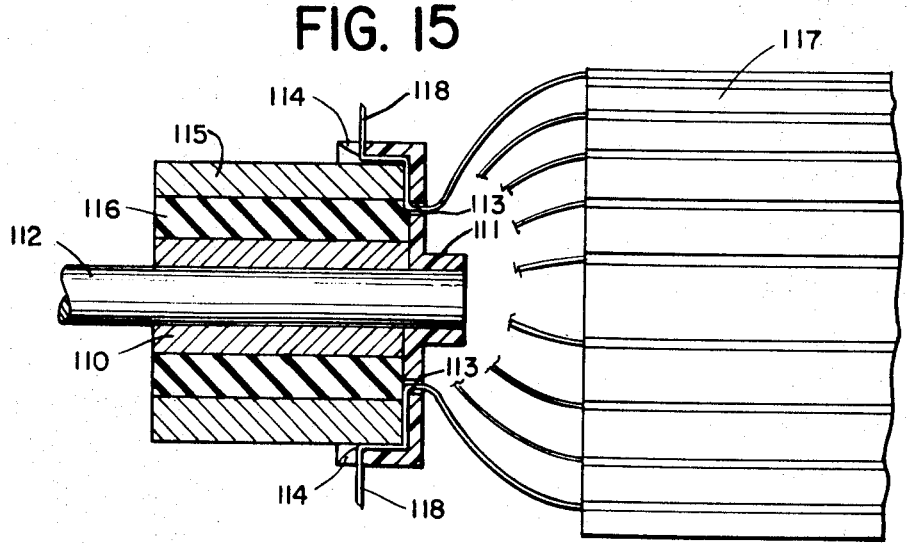
FIG. 15 is a somewhat schematic partly sectional side view of one of the connector caps according to the invention, illustrated in conjunction with its lamella and rotor structure.

In the drawings, a number of exemplary embodiments of the inventive contact assembly or connector cap are illustrated, and will be described herein in some detail, such as those of FIGS. 1 and 2, 3 and 4, 5, 6, 7, 8 and 10, 9, 11 and 12, the latter cooperating with either of FIGS. 13 and 14. All inventive cap embodiments have respective hubs 11, 21, 51, 61, 71, 81, 91, collars 12, 22, 52, 62, 72, 82, 92 openings 13, 23, 53, 63, 73, 83, 93, grooves 14, 24, 54, 64, 74, 84, 94 as well as slots 16, 56, 66, 76, 86, 96 (except the embodiment of FIGS. 3 and 4), as will be explained as the specification proceeds.

In the first exemplary embodiment of the connector cap according to the invention, a hub 11 and a collar 12 are shown in FIGS. 1 and 2, and the cap is of course attached to the armature shaft (not shown) of an electric motor. The cap is substantially cylindrical and preferably made from an insulating material.

In its front surface, at a certain distance from the hub 11 and the collar 12, a number of openings 23 may be provided, as shown in FIGS. 3 and 4, radially distributed about the periphery of the cap; their number corresponds to that of the lamellae (not shown).

FIGS. 1 and 2 also show the afore-mentioned openings 13, grooves 14 and slots 16 for the openings 13, as well as ribs 12a on the collar 12 and a thinned portion 12b, to be explained later in more detail. Ribs 57 will also be described later. Reference may be had at this point to the somewhat schematic overall side view of FIG. 15 which shows an exemplary connector cap together with the motor lamellae, the associated rotor, and the interconnecting winding ends. The inventive contact assembly includes a body 110 which carries a hub 111, surrounding a conventional shaft 112. Numerals 113 and 114 identify elements corresponding to the opening 13 and the groove 14, respectively, of FIGS. 1 and 2. Carbon lamellae 115 are secured to the body 110 in alternating relation with insulating joints or layers 116 (shown both in section).

Motor windings are shown at 117 from where the wires run to the connector cap, where winding ends 118 are made to pass through openings 113 and past grooves 114, as shown. Modifications of this schematic arrangement will be explained as the specification proceeds.

It will be clear from the description that the inventive contact assembly includes a cylindrical connector cap, preferably made of insulating material, and being provided with a hub, such as 11, 21, and a collar, e.g. 12, 22, the latter having on its periphery radial grooves, e.g. 14, 24, for receiving the armature winding ends of the electric motor. The improvement relates to the provision of a prefabricated carbon commutator body, such as shown at 15, centrally pressed into the connector cap, and also including the carbon commutator lamellae of the motor, the winding ends being in contact with the lamellae on the front side and partly on the contact surface. The front surface of the cap, facing the armature of the motor, has therein openings, such as 13, 23, for receiving the winding ends, spaced apart from the hub and the collar, and corresponding in their number to that of the lamellae while the grooves of the collar are substantially radially disposed with respect to the openings of the connector cap.

In the second embodiment, shown in FIGS. 3 and 4, the aforementioned openings 23 are circular while FIG. 7, for example, shows elliptical openings 73. For the sake of a better understanding, different sets of reference numerals have been used for the various embodiments.

As a radial extension or continuation of the openings, for example in FIGS. 1, 5, slots 16, 56 are shown which connect with the respective openings 13, 53. In the embodiments of FIGS. 3, 13 and 14, these slots have not been shown.

For producing the contact assembly according to the invention, the armature winding ends are introduced into the openings 13, 53 and they are then arranged in the respective slots 16, 56 of the collars 12, 52 in the connector caps.

FIG. 12 schematically shows a prefabricated carbon commutator or collector body 15 which can be pressed in any one of the inventive connector cap embodiments. The winding ends are pressed against the lamellae of the commutator body, on the front side and partly also on the contact surface, so that proper contact is made after having pressed the body into the cap.

In order to facilitate the mechanized introduction of the winding ends in a rational and simple manner, the openings, for example 13, 53, are preferably attainable through the slots 16, 56 starting from the outside of the collars 12, 52, radially extending in the front surfaces of the caps, and branching into the respective openings 13, 53, as shown, for example in FIGS. 1 and 5.

In the first embodiment, the slots 16 have hooked ends with which they connect to the openings 13; the embodiment of FIGS. 3 and 4 does not have slots; in FIGS. 5, 6 and 7, the respective slots 56, 66, 76 are tangentially disposed with respect to openings 53, 63, 73.

In accordance with the required schemes of the armature winding ends of the particular motor, the slots 56 reach the openings 53 from one side (FIG. 5, for example) or in case of similar parts 66, 63, from the other (FIG. 6). In connector caps suitable for all kinds of schemes, such as those shown in FIGS. 8 and 9, pairs of adjacent openings 83, 93 are provided, partly in merging relationship (such as shown in FIG. 8), flanking common slots 86, 96 of the collars 82, 92 through which they can both be reached.

The pairs of adjacent or merging openings 83, 93 are preferably correlated with a corresponding number of grooves 84, 94 on respective sides of the slots 86, 96, as shown in FIGS. 8 and 9.

Figure 16A:
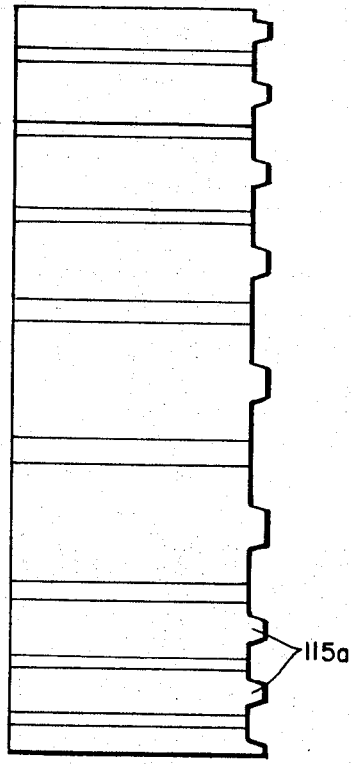
FIGS. 16a and 16b show enlarged details of the front of one of the lamella assemblies, to illustrate respective bevel and groove arrangements therefor.
Figure 16B:
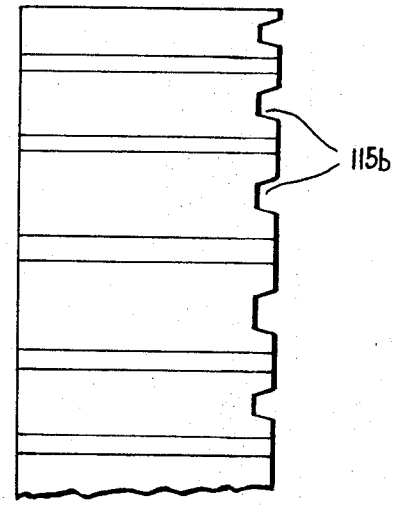

FIGS. 16a and 16b illustrate how the front sides of the carbon commutator lamellae, e.g. those shown in FIG. 15 at 115, may be provided with a bevel and/or groove structure, thereby providing a satisfactory contact. FIG. 16a illustrates the beveled portions of the lamellae, identified by numeral 115a, while FIG. 16b shows the grooved lamellae portions 115b.

The connector cap is stabilized by providing the same on its front side facing the armature (not shown) with the afore-mentioned ribs 57 (see FIG. 2) which also act as a fan for the entire motor. In FIG. 10, relative to FIG. 8, similar ribs 87 are shown but with a different shape.

In a preferred modification of the inventive connector cap, a hub may be provided with an extension 21, as shown in FIG. 4, having a length adapted to receive the commutator body 15 (FIG. 12), the length of the extended hub 21 corresponding to that of the lamellae.

However, the commutator body 15 may be provided itself with a hub 18 extending beyond the lamellae (see FIG. 12), and in this case a hub 11' of the connector cap, shown in FIG. 11 as a modification of the first embodiment (FIGS. 1 and 2), may be provided with a step-like projection 11a. Grooves 14 are provided in a collar 12' of this embodiment.

The two hub portions 11', 18 (as referred to FIGS. 11 and 12) are preferably additionally provided with mating axial profiles 21a', 21a'', as exemplified in FIGS. 13 and 14, the respective hub portions being identified 21' and 21''. This allows a precise fitting of the carbon commutator body 15 into the inventive contact assembly or connector cap.

It will be understood that the hub profiles 21a', 21a'' shown in FIGS. 13 and 14 have mating or complementary counterparts in the hub 18 of FIG. 12, separately from or in conjunction with the press fitting provided by the projection 11a in the hub 11'.

Another example for precisely fitting the body 15 of FIG. 12 into the inventive cap is exemplified by FIG. 2 wherein ribs 12a are provided on the side of the cap facing away from the armature, the number of ribs corresponding to that of the lamellae, and being positioned about midway between two grooves 14 of the collar 12, when viewed axially and clearly shown in the corresponding FIG. 1.

Additional connection between the cap and the body is achieved by uniting these elements with an electrically nonconductive adhesive, cement or resin (not illustrated). For this purpose, and for eliminating shearing of the winding ends when pressing in the commutator body 15 into the cap, the collars 12, 22, 12' may be provided with thinned peripheral portions, as shown in FIGS. 2, 4 and 11 at 12b and 22b; alterntively, stepped portions or projections 52b, 62b, 72b, 82b, 92b may be provided on the inner edges (shown in FIGS. 5 to 10).

The foregoing disclosure relates only to preferred, exemplary embodiments of the inventive contact assembly or connector cap, which is intended to include all changes and modifications, as well as additions to the examples described and illustrated, which are within the spirit and scope of the invention as set forth in the features explained in the preamble as well as the appended claims.

Thus, it should be understood, and will no doubt be appreciated by those skilled in the art, that the described features may be adopted separately or in combination, regardless of the exemplary manner in which they have been illustrated and described herein. Thus, for example, the extended hub configuration of the second embodiment (FIGS. 3 and 4) may be combined with hook-shaped slots 13 as shown in the first (FIGS. 1 and 2) and/or with double openings 83, 93 as illustrated in FIGS. 8 or 9, and/or with mating profiles 21a', 21a'' as described with reference to FIGS. 11 to 14, and so on.

Those skilled in the art will appreciate that the omitted structural details (the motor proper, with its armature, lamellae, windings, etc.) will be understood and should not be construed as detracting from the clearness or completeness of the present disclosure.

What is claimed is:

1. In a contact assembly between carbon commutator lamellae and a plurality of armature winding ends of commutator-type electric motors, the assembly including a cylindrical connector cap made of insulating material, being associated with the armature, separate from the housing of thhe motor, and being provided with a hub and a collar, the latter having on its periphery radial grooves for receiving said winding ends, the front surface of said connector cap, facing the armature of the electric motor, having therein openings for receiving said winding ends, spaced apart from said hub and said collar, and corresponding in their number to that of said lamellae, the improvement comprising a prefabricated carbon commutator body centrally pressed into said connector cap, and also including said lamellae, said winding ends being in contact with said lamellae on the front side and partly on the contact surface, said grooves of the collar being substantially radially disposed with respect to said openings of the connector cap.

2. In a contact assembly between carbon commutator lamellae and armature winding ends of electric motors, the assembly including a cylindrical connector cap made of insulating material and being provided with a hub and a collar, the latter having on its periphery radial grooves for receiving said winding ends, the improvement comprising a prefabricated carbon commutator body centrally pressed into said connector cap, and also including said lamellae, said winding ends being in contact with said lamellae on the front side and partly on the contact surface, the front surface of said connector cap, facing the armature of the electric motor, having therein openings for receiving said winding ends, spaced apart from said hub and said collar, and corresponding in their number to that of said lamellae, while said grooves of the collar are substantially radially disposed with respect to said openings of the connector cap, wherein said connector cap furthermore has therein slots starting from said collar, running substantially radially in front front surface of the connector cap, and connecting to respective openings.

3. In a contact assembly in electric motors, the improvement as defined in claim 2, wherein said slots have hooked end portions with which they connect to said openings.

4. In a contact assembly in electric motors, the improvement as defined in claim 2, wherein said slots have end portions with which they tangentially connect to said openings.

5. In a contact assembly in electric motors, the improvement as defined in claim 2, wherein at least some slots connect to two adjoining openings, there being two grooves flanking said some slots on said periphery of the collar.

6. In a contact assembly in electric motors, the improvement as defined in claim 2, further comprising a bevel and groove structure on the front of said lamellae.

7. In a contact assembly in electric motors, the improvement as defined in claim 2, further comprising reinforcements on said front surface of the connector cap, for providing a fan effect in the electric motor.

8. In a contact assembly in electric motors, the improvement as defined in claim 7, wherein said reinforcements are in the form of substantially radial ribs.

9. In a contact assembly in electric motors, the improvement as defined in claim 2, further comprising ribs on said front surface of the connector cap, the width of said ribs substantially corresponding to that of the frontal lamella joints, said grooves being disposed between two adjoining ribs when viewed axially.

10. In a contact assembly in electric motors, the improvement as defined in claim 2, wherein said collar has a thinned peripheral portion on its outer edge.

11. In a contact assembly in electric motors, the improvement as defined in claim 2, wherein said collar has a stepped projection on its inner edge.

12. In a contact assembly in electric motors, the improvement as defined in claim 2, further comprising an electrically insulating joint between said connector cap and said commutator body.

13. In a contact assembly in electric motors, the improvement as defined in claim 12, wherein said joint consists essentially of a resinous substance.

References Cited

UNITED STATES PATENTS

| | | | |
|---|---|---|---|
| 2,381,533 | 8/1945 | Forss | 310—234 |
| 2,411,684 | 11/1946 | Hamilton | 310—217 |
| 3,012,162 | 12/1961 | Rediger | 310—217 |

MILTON O. HIRSHFIELD, Primary Examiner

R. SKUDY, Assistant Examiner

U.S. Cl. X.R.

310—236

UNITED STATES PATENT OFFICE
CERTIFICATE OF CORRECTION

Patent No. 3,532,913          Dated October 6, 1970

Inventor(s) W. Förste et al.

It is certified that error appears in the above-identified patent and that said Letters Patent are hereby corrected as shown below:

Column 7, line 16 (third line from the end of claim 2), "front front" should correctly read -- said front --.

SIGNED AND SEALED
DEC 8 1970

(SEAL)
Attest:

Edward M. Fletcher, Jr.
Attesting Officer

WILLIAM E. SCHUYLER, JR.
Commissioner of Patents